April 26, 1966 K. STEPHAN 3,248,488
SWITCH CONSTRUCTION AND CONTACT CLIP
MOUNTING ARRANGEMENT THEREFOR
Filed Feb. 20, 1961 9 Sheets-Sheet 1

INVENTOR.
KURT STEPHAN
BY John W. Michael
ATTORNEY

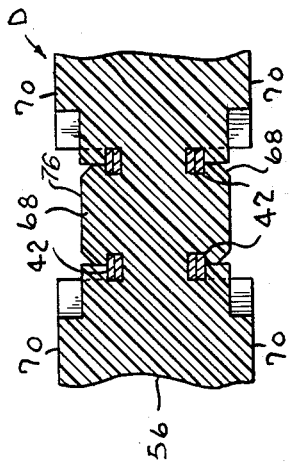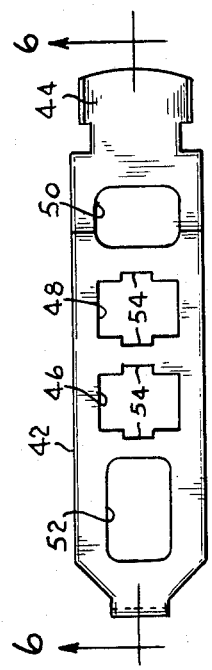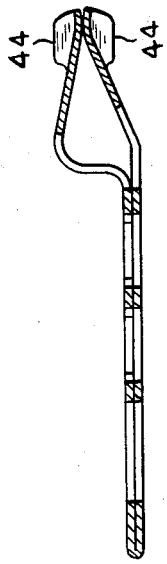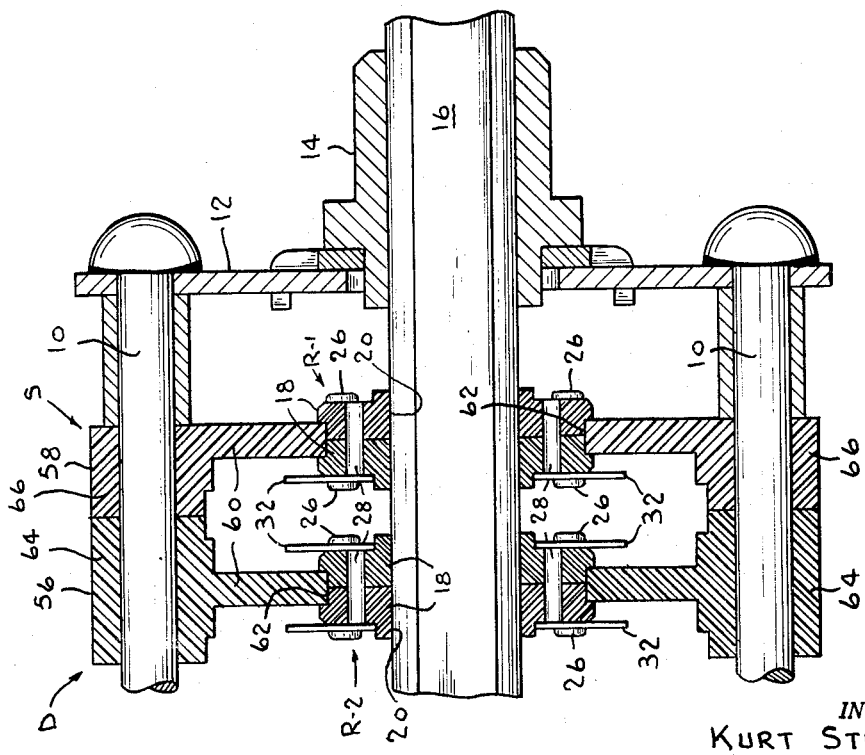

INVENTOR.
KURT STEPHAN
BY John W. Michael
ATTORNEY

April 26, 1966 K. STEPHAN 3,248,488
SWITCH CONSTRUCTION AND CONTACT CLIP
MOUNTING ARRANGEMENT THEREFOR
Filed Feb. 20, 1961 9 Sheets-Sheet 4
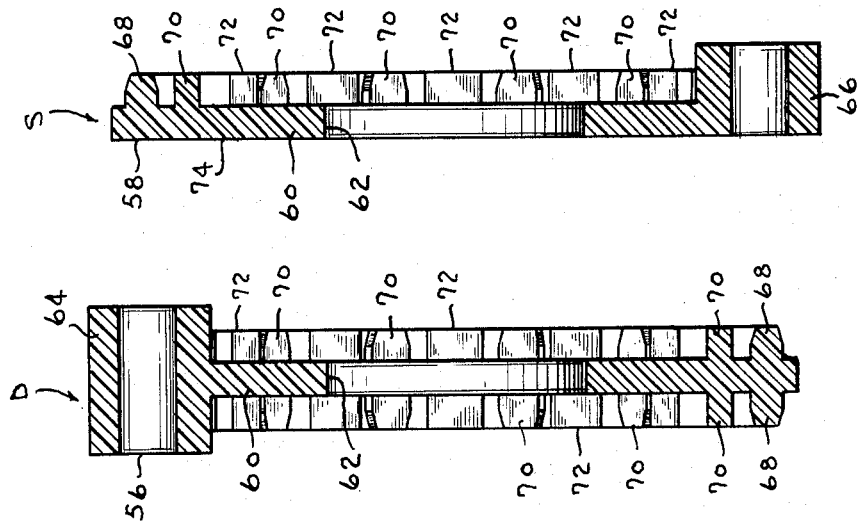
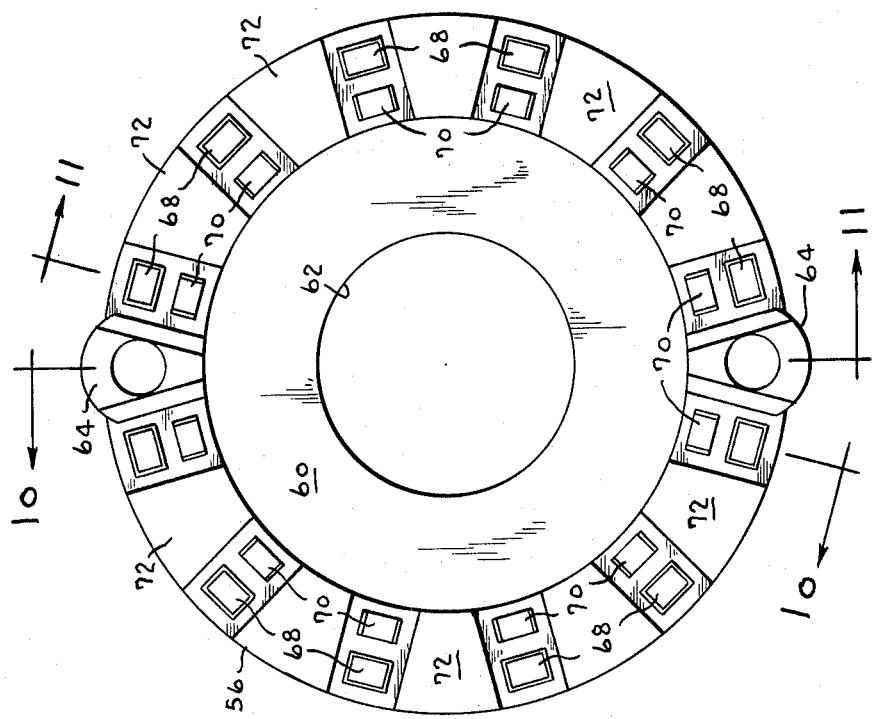
INVENTOR.
KURT STEPHAN
BY
John W. Michael
ATTORNEY April 26, 1966  K. STEPHAN  3,248,488
SWITCH CONSTRUCTION AND CONTACT CLIP
MOUNTING ARRANGEMENT THEREFOR
Filed Feb. 20, 1961  9 Sheets-Sheet 5

INVENTOR.
KURT STEPHAN
BY John W. Michael
ATTORNEY

April 26, 1966
K. STEPHAN
3,248,488
SWITCH CONSTRUCTION AND CONTACT CLIP
MOUNTING ARRANGEMENT THEREFOR
Filed Feb. 20, 1961
9 Sheets-Sheet 6
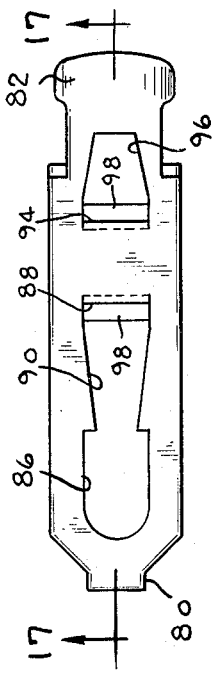
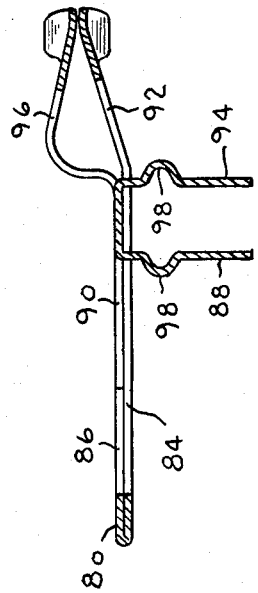
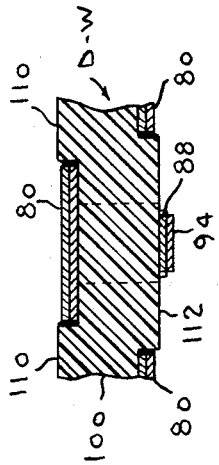
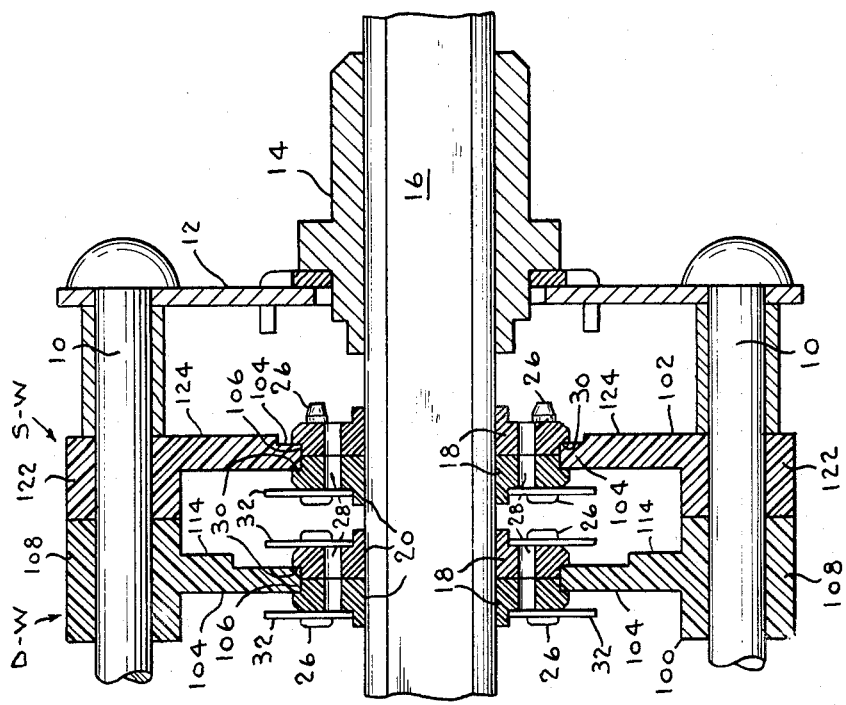
INVENTOR.
KURT STEPHAN
BY John W. Michael
ATTORNEY

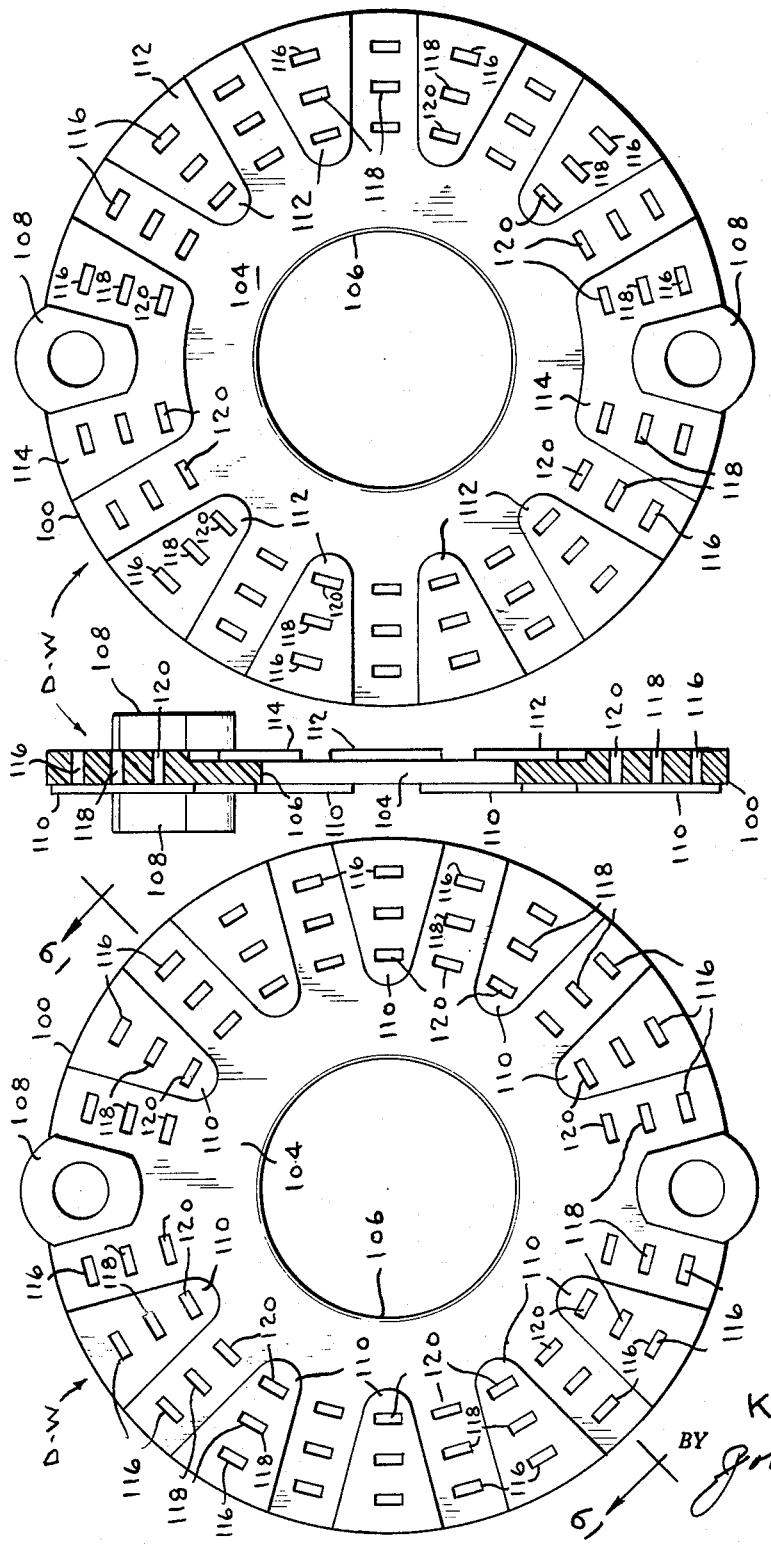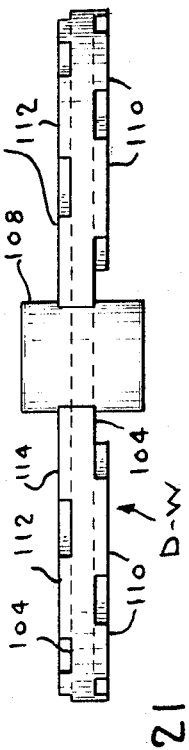

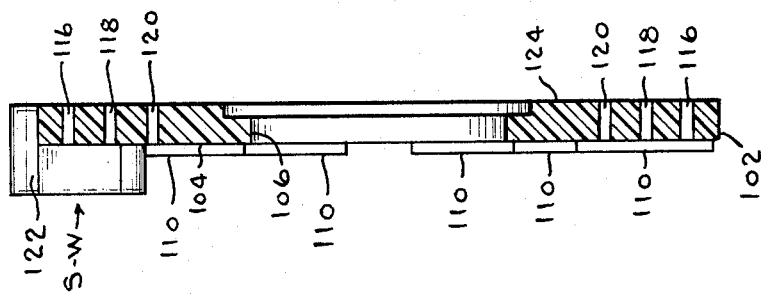
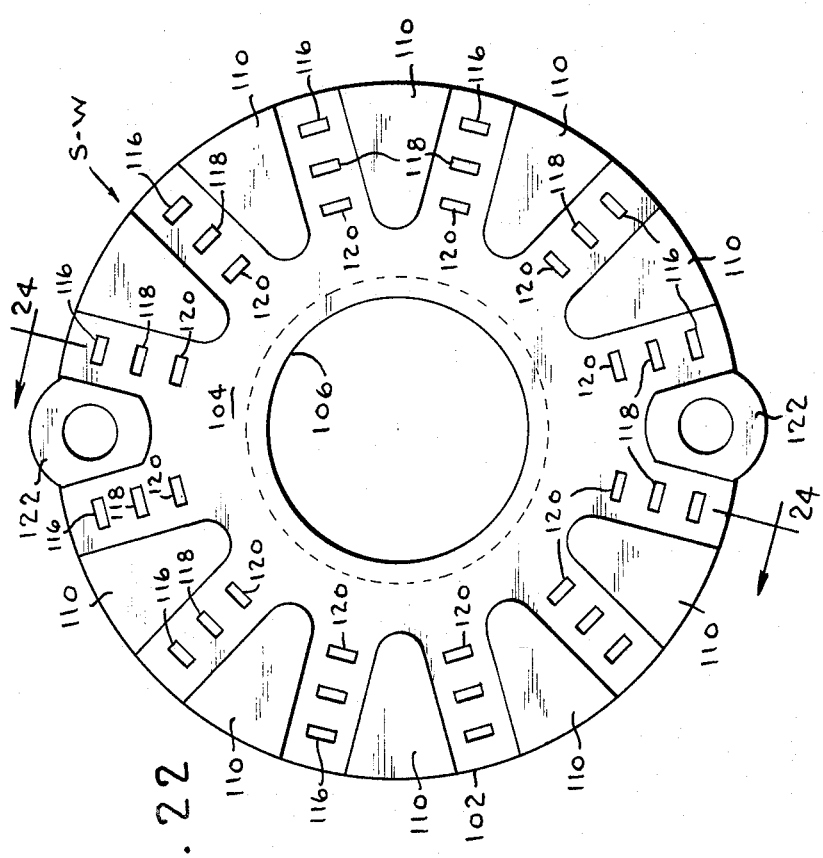
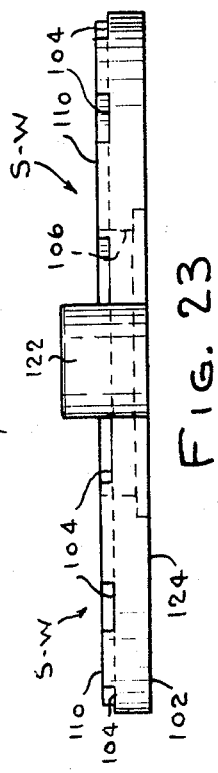

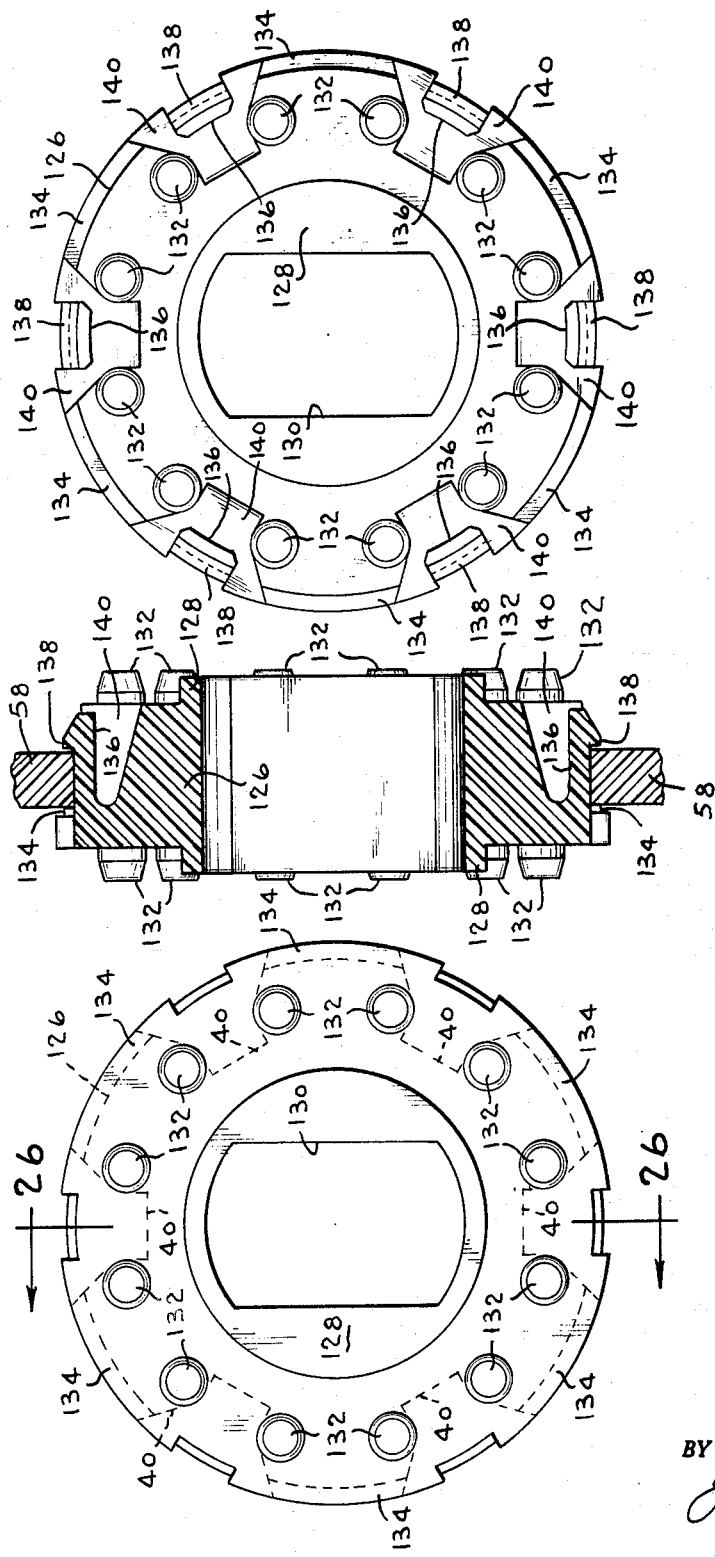

United States Patent Office 3,248,488
Patented Apr. 26, 1966

3,248,488
SWITCH CONSTRUCTION AND CONTACT CLIP MOUNTING ARRANGEMENT THEREFOR
Kurt Stephan, Milwaukee, Wis., assignor to Globe-Union Inc., Milwaukee, Wis., a corporation of Delaware
Filed Feb. 20, 1961, Ser. No. 90,575
18 Claims. (Cl. 200—11)

This invention relates to improvements in switch sections for multiple contact switches for simultaneously switching a plurality of circuits.

Switches of this type are illustrated in U.S. Patents 2,949,511 and 2,949,522, owned by the assignee of this application. In the switches of these patents both long and short clips are needed to supply the required number of switching arrangements. These clips are held in place by eyelets and oriented by projections seated in openings in the stator. In these switches the contacts are attached to multiple layer rotors by rivets or eyelets which function both to hold the rotor assembled and to provide electrical connection between contacts on opposite sides of the rotor. While these switches function satisfactorily there exist problems in their manufacture and assembly. It is necessary to stock two sizes of clips. This is costly and furthermore makes automation in assembly lines difficult to accomplish. It is also necessary to separately stock eyelets and rivets. This means more parts to be handled with consequent increased assembly time. The eyelets are hand or machine inserted and individually formed one at a time. This practice is necessitated by the large variations in circuit arrangements making automatic feed and forming a practical impossibility. Another problem results from holding the layers comprising the rotor assembled by the rivets which also form electrical connections between contacts. This cuts down the flexibility of circuits and requires more differently shaped contacts.

One object of this invention is therefore to provide a switch section of this type which can be produced at less expense than the existing style of switch sections and yet be more efficient in operation and have even more switching capabilities.

This object is accomplished by: providing a switch section which uses only one size of stator clip mounted in slots on the stator in one of several radial positions thus eliminating long and short clips; securing such clips to the stator by fastening means integral with the clip or the stator or both thus eliminating the use of eyelets or rivets; locking the fastening means for all clips at one time, such as heat sealing or spot welding; forming the rotor from two identical halves, each of which has a hole and pin configuration which cooperates from one half to the other to index the halves and hold them assembled; and providing the rotor halves with (a) heat sealed nibs for mounting and holding the contacts and (b) holes which will accommodate a rivet or the like to electrically connect contacts on opposite sides of the rotor when desired; thus increasing the flexibility of contact arrangement.

Another object of this invention is to provide a rotor for a switch section having the foregoing characteristics which may be quickly inserted in the stator.

This object is accomplished by providing a molded rotor with a plurality of integral flexible fingers at its periphery extending in the same direction as the axis of rotation of the rotor. These fingers have sloping faced barbs which cause the fingers to be sprung back when the rotor is slid axially into place in the stator. The fingers thereupon snap back and the backs of the barbs engage the stator and hold the rotor in operative position.

Other objects and advantages are hereinafter set forth or will be apparent from the specification and claims describing the embodiments shown in the drawings in which:

FIG. 3 is a sectional view taken on the line 3—3 of FIG. 1 showing both the double sided and single sided switch sections embodying the present invention;

FIG. 4 is an enlarged fragmentary sectional view taken on the lines 4—4 of FIG. 1;

FIG. 5 is an end view of the stator clip used in this modification;

FIG. 6 is a sectional view taken on the line 6—6 of FIG. 5;

FIG. 9 is an outer end view of both the stators (without clips) for the double sided and single sided switch sections shown in FIG. 3;

FIG. 10 is a sectional view taken on the line 10—10 of FIG. 9 of the stator (without clips) of the double sided switch section shown in FIG. 3;

FIG. 11 is a sectional view taken on the line 11—11 of FIG. 9 of the stator (without clips) of the single sided switch section shown in FIG. 3;

FIG. 14 is a sectional view taken on the line 14—14 of FIG. 12, showing both the double sided and single sided switch sections of this modification of a switch section embodying the present invention;

FIG. 15 is an enlarged fragmentary sectional view taken on the lines 15—15 of FIG. 12;

FIG. 16 is an end view of the stator clip used in this modification;

FIG. 17 is a sectional view taken on the line 17—17 of FIG. 16;

FIG. 18 is an outer end view of the stator (without clips) for the double sided switch section shown in FIG. 14;

FIG. 19 is a sectional view taken on the line 19—19 of FIG. 18;

FIG. 20 is an inner end view of the stator shown in FIGS. 18 and 19;

FIG. 21 is a side view of such stator;

FIG. 22 is an end view, taken from the left in FIG. 14 of the stator (without clips) for the single sided switch section shown in FIG. 14;

FIG. 23 is a view in side elevation of the stator shown in FIG. 22;

FIG. 24 is a sectional view taken on the line 24—24 of FIG. 22;

FIG. 25 is an end view of a rotor embodying a second or snap-in modification of the rotors embodying the present invention;

FIG. 26 is a sectional view taken on the line 26—26 of FIG. 26; and

FIG. 27 is an end view of the other end of such rotor.

Figure 1:
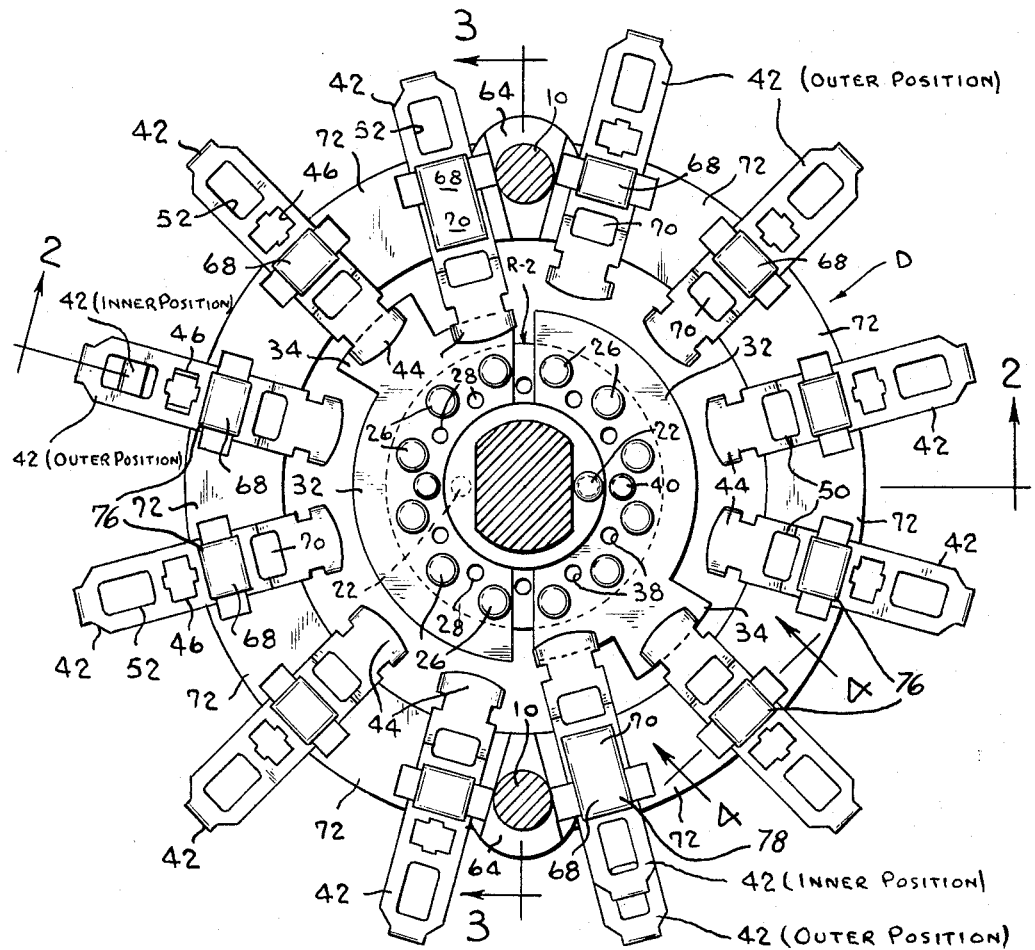
FIG. 1 is an end view of a multiple section switch taken from the double sided switch section end showing a first modification of a switch section embodying the present invention.

The various modifications of the switch sections shown in the drawings, as is well known in this art, are mounted singly or in multiple units on rods 10 which bind them to each other and to a mounting plate 12. This plate is provided with a bushing 14 rotatably carrying a flatted operating shaft 16 which passes through an opening in the rotor of each switch section. As shown in FIGS. 3 and 14, a double sided switch section D and/or D–W may be joined with a single sided switch section S and/or S–W. The principal difference between these sections is that the single sided sections S and S–W have twelve switching stations, the double sided section D has twenty-four stations and the sections D–W have twenty-two stations.

There are shown two modifications of stator and clip design. One modification identified as the "heat sealed" design is shown in FIGS. 1 to 11, inclusive. The other modification identified as the "welded" design is shown in FIGS. 12 to 24, inclusive. The welded sections are identified by the subsidiary reference "W."

Figure 2:
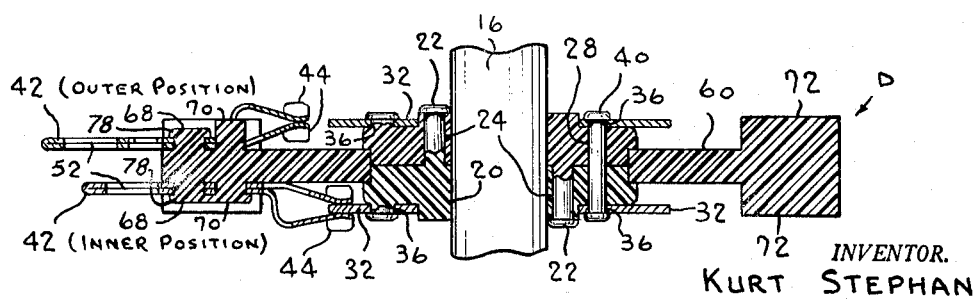
FIG. 2 is a sectional view taken on the line 2—2 of the double sided switch section of FIG. 1.

The principal modifications of rotor design, designated R–1 and R–2, are shown in FIGS. 1 to 3, inclusive, 7, 8, and 12 to 14, inclusive. It is used with both the "heat sealed" and "welded" stator and clip designs. Another modification of rotor design, designated R–S (rotor-snap-in) and shown in FIGS. 25 to 27, inclusive, simplifies assembly in that such rotor may be quickly snapped into position. However, the "snap-in" rotor is more expensive to manufacture and is mostly practical for use with single sided stators.

The rotor

Figure 7:
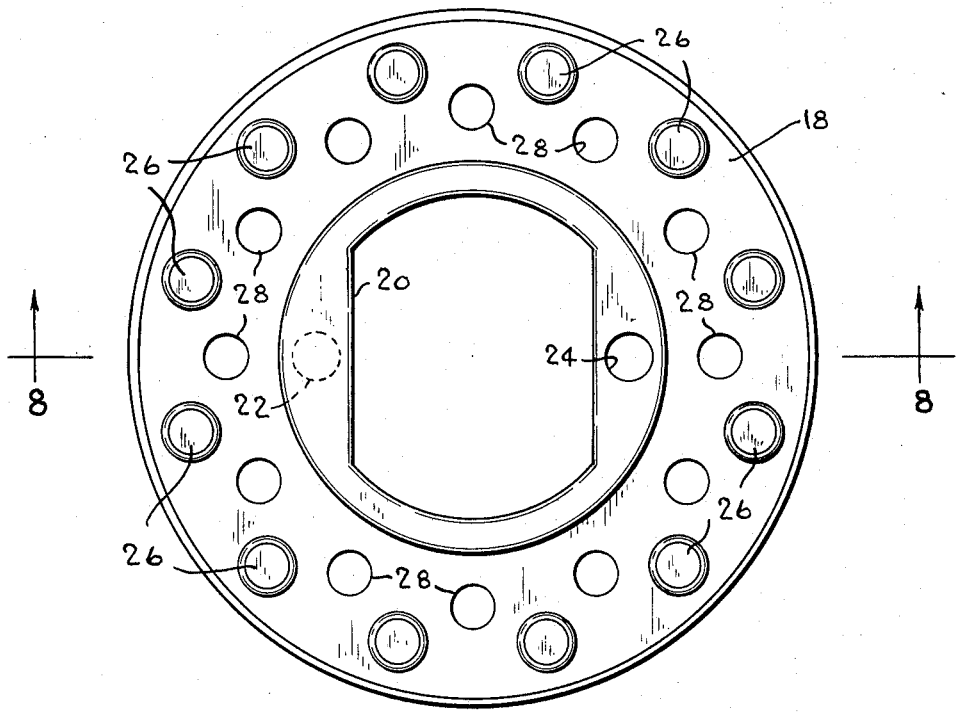
FIG. 7 is an enlarged outer end view of one half of the rotor shown in FIGS. 1 to 3, incl., and FIGS. 12 to 14, incl., without the contacts attached.
Figure 8:
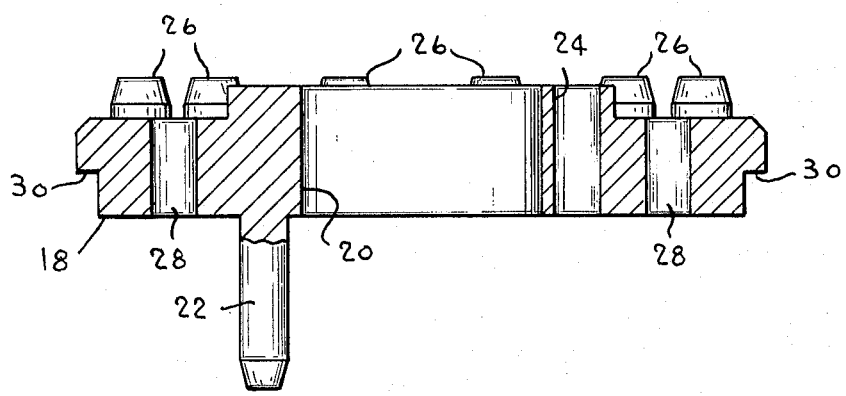
FIG. 8 is a sectional view taken on the line 8—8 of FIG. 7.

Since both the "heat sealed" and "welded" designs of the switch sections use the same rotor, it will be described first. A rotor R–2 for the double sided sections D and D–W is made of two halves 18 of identical design (see FIGS. 7 and 8). A rotor R–1 (see FIG. 3) for a single sided section S is likewise made of the two halves 18, however, only one half is provided with contacts. The rotor halves 18 as shown in FIGS. 7 and 8 are molded from a general purpose polystyrene or other thermoplastic plastic material. They are provided with: a central non-round shaft hole 20 into which the shaft 16 non-rotatably fits; a pin 22 with tapred end adjacent such shaft hole; and a pin hole 24 diametrically opposite from the pin 22 and equally spaced from the shaft hole. The pin has slightly larger diameter than that of the pin hole. With this arrangement the halves may be placed in back-to-back juxtaposition with the pin of one press-fitted into the pin hole of the other to make a complete rotor with the halves properly indexed and temporarily held. Each half is also provided with twelve equally angularly spaced laterally projecting contact mounting nibs 26. These nibs have their outer ends tapered as shown to make it easier to mount the contacts. This spacing of nibs permits a large variety of angularly related positions of the contacts with respect to the angularly fixed position of the rotor relative to the shaft. Spaced angularly centrally of the adjacent nibs, the rotor halves have twelve connector holes 28 through which may be inserted electrical connector elements to make an electrical connection between contacts on opposite sides of a double sided stator.

In order to keep an assembled rotor in operative position within a stator opening, each half 18 has a peripheral flange forming a shoulder 30 facing the inner wall of the half. When assembled into a rotor these shoulders slidably overlie opposite sides of the stator adjacent to rotor opening and form the axial bearing support for the rotor, while the circumferential wall slides along the opening in the stator to provide a radial bearing.

Figure 12:
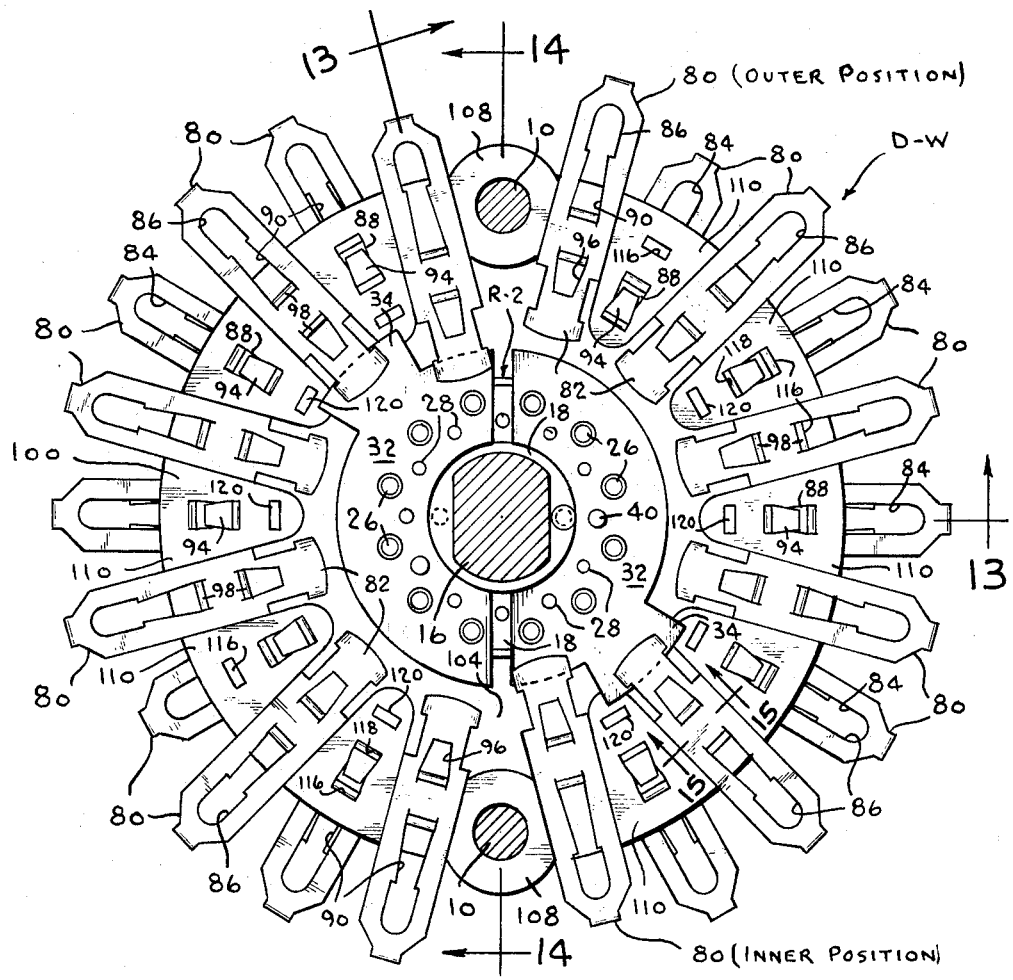
FIG. 12 is an end view of a multiple section switch taken from the double sided switch section end showing a second modification of a switch section embodying the present invention.

The rotor assemblies R–1 and R–2 each carry contacts 32, generally shaped as shown in FIGS. 1 and 12. These contacts have angularly extending arcuate-like bodies from the peripheries of which project one (or more) clip engaging tabs 34. Six nibs receiving holes 36, angularly spaced at 30° as shown in FIG. 2 are formed in the arcuate-like bodies. These holes are large enough to permit the contacts to be readily assembled in a selected position on the nibs 26. Each contact also has connector holes 38 which are angularly spaced centrally of adjacent nib receiving holes so that when a contactor is mounted on the rotor over the nibs 26 the connector holes 38 in the contactor will be in alignment with the connector holes 28 in the rotor. One or more connector elements 40 may be inserted in selected ones of twelve positions to make the desired electrical connection between contactors on opposite sides of the rotor. These elements may be metal eyelets, rivets, pins, or other electrically conductive components. Only one standard shape of die is needed to make the contactors 32 in the shape and size shown in FIGS. 1, 2, 12, and 13. Such contactor may have an angular length slightly less than 180° as measured from the center of rotation. This provides a spacing between adjacent contactors as shown. However, since the tab spacing and hole spacing are at 30° increments, parts of the arcuate-like body may be cut off to make contacts small enough to provide rotors with more than two spaced contacts per side. The contacts may also be inverted to change relative angular position of the tabs 34. Thus a wide range of contact selection is readily and cheaply obtained.

The best method of assembling the rotor will be explained more fully after the stators have been described in particular. Suffice it now to point out that after the halves 18 have been placed in back-to-back juxtaposition they will remain in such position by the frictional engagement between pins 22 and holes 24 during subsequent operations such as adding contacts 32 as needed on the nibs 26. The projecting ends of the pins 22 and nibs 26 may be simultaneously heat sealed to provide enlarged heads, holding all these components in a rigid assembly.

The heat sealed stator

The stators for switch sections of the "heat sealed" design are shown in FIGS. 1 to 3 inclusive and 9 to 11, inclusive. The clips mounted on such stators for engaging the rotor contacts are shown in FIGS. 1 to 6 inclusive. There may be twenty-four of such clips on the stator for the double sided switch section D and twelve such clips on the stator for the single sided switch section S. Reference to these figures show that in many circuit arrangements at least one clip for each contact is in engagement with the arcuate-like body of the contact 32 while other clips are only intermittently contacted by the tabs 34 on such contacts. A feature of this invention is that only one size clip 42 is used to perform either of these functions.

The clips which engage the body of the contact are referred to as being in the "inner position" while the other clips will be described as being in the "outer position."

Each clip 42 as shown in FIGS. 4 and 5 is constructed by folding a formed metal (spring brass) blank about the outer end of the clip to form an upper and lower layer. The inner ends of such layers are bent to a permanent spring biased set to form opposed contact wiping jaws 44 of a design well known to those skilled in this art. Each clip 42 (which may be silver plated) differs from those previously used in that its body portion is provided with three openings 46, 48, and 50 in addition to the usual terminal lead opening 52. The openings 46 and 48 are designed to fit over nibs projecting from the stator to accurately locate and hold each clip. As will be hereinafter explained, the nibs are heat sealed to provide heads which maintain the clip securely in place. That part of the openings 46 and 48 which are in the upper layer of the clip are slightly smaller than that part of such openings in the lower layer of the clip. The lower part fits freely over the stator nibs but the upper part is a press or obstruction fit on such nibs. In order to ease the forcing of the clip on to the nibs, the upper part of openings 46 and 48 may have opposed notches 54 which lessens the length of the press fit. The corners of these notches also dig into the material of the nib to aid in making a rigid connection between the clip and nib resisting angular displacement of the clip. This press fit arrangement not only assures accurate alignment but also holds the clips in position during any subsequent assembly operations.

The opening 50 is used when the clip is placed in the outer position to freely accommodate the inner one of the stator nibs which is not heat sealed when the clip is in such position.

A double sided stator 56 for the double sided switch section D is shown in FIGS. 1 to 4, inclusive, 9, and 10. A single sided stator 58 for the single sided switch section S is shown in FIGS. 3, 9, and 11. These stators are molded using a general purpose phenolic or other thermosetting plastic material. Since the outer (left) end of the single stator 58 (see FIG. 3) is identical with the outer end and the inner end of the double stator 56, the same reference numerals will be applied to the clip mounting nibs, clip holding lands, and other common elements. Each stator has a web 60 provided with a central opening 62 which accommodates and provides radial bearing for the rotor. As previously explained the opposed shoulders 30 of the rotor overlap the periphery of the opening 62 to prevent axial displacement of the rotor when assembled. Each stator has diametrically opposed mounting spacers 64 (for double stator) and 66 (for single stator) provided with holes for the rods 10 so that the switch sections can be mounted on such rods and properly spaced. At 30° angular intervals the web 60 has laterally projecting clip mounting outer nibs 68 and inner nibs 70 arranged in radially aligned pairs. The outer nibs 68, arranged along an outer circle, are designed to have an obstruction fit in a radial direction relative to the stator with the openings 46 and 48 in the upper layers of the clips 42. The ends of these nibs are sloped on all four sides as shown to facilitate assembling the clip. The inner nibs 70, arranged along an inner circle, are designed to have a press or obstruction fit in an angular direction relative to the stator with the openings 46 and 48 in the upper layers of the clips 42. Only the sides of the inner nibs facing angularly of the stator are tapered to assist clip mounting. However, the inner nibs 70 have a clearance fit in the opening 50 to readily permit a clip to be seated in an outer position. Between each adjacent pair of nibs 68 and 70 the web of the stator has raised lands 72 the sides of which so spaced with respect to the nibs and the sides of clips 42 positioned on such nibs as to have a press fit engagement with such clips and restrict side or angular motion. The sides of such lands provide enough material adjacent the clips so that portions thereof may be deformed under heat to overlie the clips as hereinafter described.

The single stator 58 has a flat side 74 which is coextensive with the plane of one side of the web 60. Hence it is possible to make a die one part of which is the same for both the double and single stators. The parting for such die lies in the plane of one side of such web. Thus with only three parts a die may be made which is suitable for making both stators.

*Assembly and heat seal*

The first step for easy assembly is to place the rotor halves 18 on opposite sides of the stator 56 or 58 with the pin 22 of one half aligned with the pin hole 24 of the other half and press the halves together to frictionally hold them in place. This subassembly can now be handled as a unit.

To assemble a double sided switch section the desired contacts 32 are laid in proper places in a lower jig and properly indexed. Then clips 42 are placed as needed in such lower jig with the jaws of the inner positioned clips slid over the body of the contact and the jaws of those outer positioned clips in radial alignment with the tabs 34 of such contacts slid over such tabs. The assembled stator (without clips) and rotor (without contacts) unit is now placed on such jig with the rotor nibs 26 properly aligned with the contact nib holes 36 and the stator nibs 68 and 70 properly aligned with the clip nib holes 46 and 48 or 48 and 50 as the case may be. The tapered ends of the nibs will partially enter the nib holes to temporarily index the parts.

The contacts 32 and clips 42 for the other side of the switch section are now laid in place on the nibs on the upper side of the stator-rotor unit. Care must be taken to seat the nib holes on the tapered ends of the nibs and to slide the clip jaws, where required, on the contacts. An upper press or jig member in now brought down toward the lower jig to press all these parts together with the clips and contacts firmly pressed onto the nibs and fully seated on the bodies of the rotor and stator. Heat applying members (part of the jig and press) are now brought into direct contact with the nibs to form plastic nib heads as shown. With respect to the stator, it is desirable to have the heat sealing member for the outer nibs 68 made large enough to also contact a part of the lands 72 on each side of the clip and cause material from such lands to be formed over the body of the clips and make an enlarged head 76 as shown in FIGS. 1, 2, and 4. The method of forming the heat seal connection and the use of thermosetting material in forming the heat seal connection between the contact clip and the stator, or generally between a conductive member and its support, is the subject of a co-pending application of Mr. Kurt Stephan, Serial No. 478,377, filed August 9, 1965, and assigned to the assignee of this application and claiming the benefit of the filing date of this application. In the case of the inner positioned clips where both inner and outer nibs 68 and 70 are heat sealed and headed, a single enlarged head such as is indicated at 78 in FIGS. 1 and 2 is usually formed.

When an electrical connection is needed between contact 32 on opposite sides of the rotor, the electrical connectors 40 may be inserted in the rotor unit after assembly to the stator and before such unit is put in the sealing press. However, such connectors may be added after the completion of the assembly. The fit of the connector with the holes 38 must be tight enough to make a good connection. Additionally, the connectors may be headed as shown to accomplish the same result.

The assembly is substantially the same in the case of the single sided section S. Since there are no clip nibs on the side 74 of the stator 58, no clips are added. Likewise no contacts 32 are placed on the nibs of that side of the rotor R–1 adjacent to such flat side 74.

The press fit, heat seal from the lands 72, and the nib head seals all combine to hold each clip rigidly and securely fastened to the stator. Because of the close tolerances obtainable with this molded construction all the contact jaws lie in substantially the same plane thus insuring a minimum of resistance to the turning of the rotor and uniform contact pressures. Since angular movement of the clips is positively prevented the timing of the multiple switching can be held to close tolerances.

This heat sealed design simplifies automation of section assembly, offers an unlimited switch configuration, reduces the number of parts per section and finally results in a multisection switch of high efficiency and long life.

*The welded stator*

Figure 13:
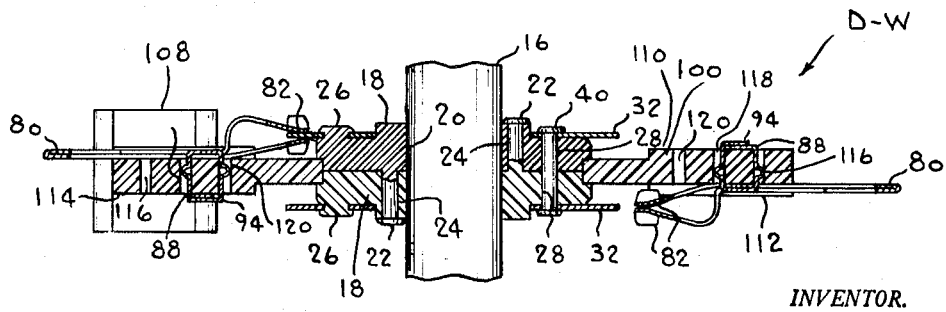
FIG. 13 is a sectional view taken on the line 13—13 of the double sided switch section of FIG. 12.

The stators for the switch sections of the "welded design" are shown in FIGS. 12 to 14, inclusive, 18 to 21, inclusive (double sided section), and 22 to 23, inclusive (single sided section). The clips mounted on such stators for engaging the rotor contacts are shown in FIGS. 12, 13 and 15 to 16, inclusive. Reference to these figures show that in many circiut ararngements at least one clip for each contact is in engagement with the acruate-like body of the contact 32 while other clips are only intermittently contacted by the tabs 34 on such contacts. A feature of this invention is that only one size clip 80 is used. To make this possible the clips in engagement with the body of the contact are positioned radially of the stator in an "inner position," and the other clips are positioned radially of the stator in an "outer position." The stator for the double sided section D–W may have as many as twenty-two of such clips angularly staggered on opposite sides as shown. The stator for the single sided section S–W may have as many as eleven of such clips.

Each clip 80 as shown in FIGS. 15 to 17, inclusive, is constructed by folding a formed metal (spring brass) blank about the outer end of the clip to form an upper and lower layer. The inner ends of such layers are bent to a permanent spring biased set to form opposed contact wiping jaws 82 of a design well known to those skilled in this art. These clips (which may be silver plated) differ from the clips for the heat sealed design in that they are provided with spaced integral mounting tabs which fit in tab openings in the stator rather than the nib receiving openings of the heat seal design clips. The lower layer of clip 80 has an elongated slot 84 with a rounded portion at its outer end. The outer portion of this slot cooperates with an opening 86 in the upper layer to form the usual terminal opening to which leads may be soldered. The inner portion of the long slot 84 permits a tapered outer tab 88 punched from the upper layer in the shape indicated at 90 to be bent downwardly through such slot to form part of the clip mounting means. The lower layer has another slot 92 which permits a tapered inner tab 94 cut in the form indicated at 96 from the upper layer to be formed downwardly through such opening to form another part of the clip mounting means. Both the outer tab 88 and the inner tab 94 are provided with offset humps 98 near the lower surface of the clip. These humps are designed so that the tabs have an interference fit with the sides of the slots in the stator. The width of the tabs 88 and 94 is such as to have an interference fit with the ends of the slots in the stator. The taper provided on the tabs is sufficient to permit easy insertion in the slots in the stator for assembly.

The double sided stator 100 for the double sided switch section D–W is shown in FIGS. 12 to 14, inclusive, and in detail without clips in FIGS. 18 to 21, inclusive. A single sided stator 102 for the single sided switch section S–W is shown in FIG. 14 and in detail without clips in FIGS. 22 to 24, inclusive. Both these stators are molded using a thermosetting plastic such as glass reinforced alkyd molding compound.

The stator 100 has a web 104 provided with a central opening 106 forming a radial bearing for the rotor R–2. This web is supported by diametrically positioned mounting spacers 108 having holes which fit over the rods 10 to properly locate and mount the switch sections. The left face (see FIGS. 12 and 18) of this stator has stations for 12 clips 80 and the right face (see FIG. 20) has stations for 10 such clips. The stations on the left face are angularly spaced 30°. The stations on the right face are also angularly spaced 30° except that the two on opposite sides of the spacers 108 are spaced 60°. The stations on one face are angularly offset 15° from the stations on the other face so that clips on one side are insulated from those on the other side. The stations on the left face are defined by raised lands 110 which provide walls between which the clip is positioned to hold it against angular movement. The spacers 108 provide such walls for the adjacent stations on such side. The stations on the right face are defined by raised lands 112 and raised lands 114. The latter are slightly larger and extend partially around the spacers 108. All such lands provide walls between which clips on this face are held against lateral displacement. Within each station there is a set of tab receiving slots aligned radially of the stator. Such set consists of an outer slot 116, middle slot 118 and an inner slot 120. These slots are dimensioned so that the tabs 88 and 94 have a press or obstruction fit on all four sides for the purpose of accurately locating the clips, preventing relative movement of such clips and temporarily holding the clips in place for additional assembly steps.

The single sided stator 102 is substantially of the same design and configuration as the double sided stator 100. The common identical features are given the same reference numerals, i.e.: a web 104 provided with a rotor opening 106; a left face with stations for 12 clips 80 spaced by raised lands 110; and sets of tab receiving slots consisting of outer slot 116, middle slot 118, and inner slot 120. This stator also has mounting spacers 122 with openings for the rods 10, however, such spacers project only from the left face. These elements all function like the same elements in the double sided stator 100. The right face of the web 104 has a circular raised portion with a flat face 124. This portion makes the thickness between the left face of a clip station and such flat face the same as the distance between a clip station on one side and the land on the opposite side of such clip station on the double sided stator. When a clip 80 is to be placed in the "inner position" its tab 94 is inserted in the inner slot 120 and its tab 88 is inserted in the middle slot 118. The clips to be positioned in the "outer position" have their tabs 94 inserted in the slots 118 and their tabs 88 inserted in the slots 116. This results in two advantages: (1) the same size clips and tabs may be used; and (2) the die half for the left hand face is the same for both stators.

*Assembly and weld*

The first step for easy assembly is to place the rotor halves 18 on opposite sides of the stator 56 or 58 with the pin 22 of one half aligned with the pin hole 24 of the other half and press the halves together to frictionally hold them in place. This subassembly can now be handled as a unit.

To assemble a double sided switch section the desired rotor contacts 32 are laid in proper places in a lower jig properly indexed. Then the desired clips 80 with tabs 88 and 94 upwardly projecting are placed in such lower jig with the jaws 82 of the inner positioned clips slid over the contact body and the jaws of those outer positioned clips in radial alignment with the tabs 34 of such contacts slid over such tabs. The assembled stator and rotor unit is now placed in such jig with the rotor nibs 26 properly aligned with and started into the contact nib holes 36 and the clip tabs 88 and 94 properly aligned with and started into the stator slots 116 and 118 or 118 and 120 as the case may be. The tapered ends of the tabs will partially enter the slots to temporarily index the parts.

The contacts 32 and clips 80 with tabs downwardly projecting for the other side of the switch section are now laid in place on the nibs of the rotor and the proper slots of the stator. Care must be taken to start the nibs and tabs in the proper holes and slots and to slide the clip jaws, where required, on the contacts. An upper press or jig member is now brought down toward the lower jig to press all these parts together with the clips and contacts firmly seated on the bodies of the rotor and stator. Heat applying members (part of the jig and its press) are now brought into direct contact with the nibs of the rotor to form plastic nib heads as shown. Metal folding plungers incorporated with such jig are urged toward the projecting tabs from both sides of the stator to first bend tabs 88 tightly against the surface of lands 110, 112, and 114 and then bend tabs 94 tight against the thus bent over portions of the tabs 88. Heat is then applied to these portions of the tabs to secure them permanently. Either a welded or soldered joint may thus be made.

When an electrical connection is needed between contacts 32 on opposite sides of the rotor, the electrical connectors 40 may be inserted in the rotor unit after assembly to the stator and before such unit is put in the assembly press. However, such connection may be added after the completion of the assembly. The fit of the connectors with the holes 38 must be tight enough to make a good connection. Additionally, the connectors may be headed as shown to accomplish the same result.

The assembly is substantially the same in the case of the single sided section S. Since there are no tab slots for clips on flat face 124 of the stator 102, no clips are added. Likewise no contacts 32 are placed on the nibs of that side of the rotor R–1 adjacent to such flat face.

The press fit of the tabs in the slots, the side bearing action of the lands 110, 112, and 114, and the tight hold of welded tabs 88 and 94 all combine to hold each clip rigidly and securely fastened to the stator. Because of the close tolerances obtainable with this construction all the contact jaws lie in substantially the same plane thus insuring a minimum of resistance to the turning of the rotor and even contact pressures. Since angular movement of the clips is positively prevented the timing of the multiple switching can be held to close tolerances.

This design simplifies automation of section assembly, offers an unlimited switch configuration, reduces the number of parts per section and finally results in a multisection switch of high efficiency and long life.

*The snap-in rotor*

The design of the rotor R–S shown in FIGS. 25 to 27, inclusive, while particularly adapted for use with a single sided stator such as stators 58 and 102, may, however, be used with double sided stators such as 56 and 100. Unlike the rotors R–1 and R–2 made of two halves, the rotor R–S is made as a single molded piece of thermoplastic material. It has a cylindrical body 126 which rotatably fits in the rotor openings of the stators. This body has hubs 128 and a central non-round shaft hole 130 passes through such hubs and body to receive the shaft 16. It also has twelve nibs 132 projecting laterally from each side at equally angularly spaced intervals. These nibs are tapered and hold contacts 32 (not shown) in the same way as the rotors R–1 and R–2. Some of these nibs may be omitted and replaced with holes through which electrical connectors can be passed to electrically connect, when desired, contacts on opposite faces of the rotor.

Projecting from the body 126 are six spaced arcuate flange-like portions 134 which bear against one side of the web of such stators to prevent axial displacement of the rotor in one direction. In general alignment with the areas of the body between such flanges, there project from such body in an axial direction six fingers 136. The outer ends of these fingers have sloping faced barbs 138 which have heads the outer ends of which are spaced slightly radially outwardly of the circumference of the body 126. These fingers are resilient and when the rotor is inserted into the openings in the stator the sloping faces of the barbs will engage such openings and depress the fingers radially inwardly until the heads of the barb pass through such openings. The fingers will then spring back to normal position and the barbs will engage the other side of the stator web to prevent axial displacement in the other direction.

In order to mold the fingers and barbs integrally with the body and to provide flexing space for the fingers the body 126 adjacent such fingers has cavities 140 shaped as shown. A rotor thus constructed may be readily snapped into operating position with a stator and thus reduce assembly costs. After a rotor is thus positioned the contacts and stator clips can be assembled in the same way heretofore described.

Although several embodiments of the present invention have been illustrated and described, it will be apparent to those skilled in the art that various changes and modifications may be made therein without departing from the spirit of the invention or from the scope of the appended claims.

I claim:

1. In a switch section, a relatively movable insulating member and a fixed insulating member adjacent said movable insulating member, a conductive contact carried by one of said members having inner and outer clip engaging portions, the other of said members having spaced clip mounting stations arranged laterally outwardly of said one of said members and at least one of said stations being provided with inner and outer clip mounting positions with respect to said one of said members and said inner and outer clip mounting positions being relatively aligned in a direction extending generally transversely of the direction of relative movement between said fixed and movable members, a plurality of clips mounted on said other of said members with at least one of said clips positioned in said inner clip mounting position, said clips being identically sized and having a length sufficient to permit said clips to alternatively extend from one of said inner and outer clip mounting stations and engage the complementary one of said inner and outer clip engaging portions of said conductive contacts, and fastening means for locking said clips in said mounting stations.

2. The invention as defined in claim 1 in which said fastening means includes integral projections on one said clips and said mounting stations and complementing projection receiving holes on the other of said clips and said mounting stations.

3. The invention as defined in claim 2 in which said projections are an obstruction fit in said complementing holes.

4. The invention as defined in claim 2 in which said holes are provided in said clips and said projections have formed heads pressing against said clips and urging said clips into engagement with the other of said members.

5. The invention as defined in claim 2 in which pairs of said projections are overlapped and secured together to hold said clips in place.

6. The invention as defined in claim 1 in which said other of said members is made of plastic material, said clip mounting stations are defined by opposed, spatially separated walls extending outwardly from said other of said members, and said clips positioned in said stations for engagement with and to be restrained against rotative movement by said walls.

7. The invention as defined in claim 6 in which said fastening means consists of projections in said clip mounting stations and complementing holes in said clips, said projections have formed heads pressing on said clips and urging said clips into engagement with the other of said members, and part of said material adjacent said walls is formed over and against said clips.

8. The invention as defined in claim 6 in which said fastening means consists of spaced tabs bent from the body of said clips and spaced slots in said stator within said mounting stations, the ends of said tabs extending beyond said slots being bent over one upon the other and secured together.

9. In a switch section for a multiple contact switch for simultaneously switching a plurality of circuits, a rotor, a contact carried by said rotor having radially inner and outer clip engaging portions, a stator provided with an opening in which said rotor is carried, said stator having a plurality of clip mounting stations arranged about and spaced radially outwardly of said opening, at least one of said stations having radially aligned inner and outer clip mounting positions, a plurality of clips mounted on said stator with at least one of said clips positioned in said inner mounting position, said clips being identically sized and having a predetermined length such that said clips can extend from said inner and outer clip mounting stations and engage said inner and outer clip engaging portions of said conductive contacts respectively, and fastening means for locking said clips to said stator.

10. The invention as defined in claim 9 in which said fastening means includes integral complementing projections on one and projection receiving holes through the other of said clips and said stator.

11. The invention as defined in claim 10 in which said projections are an obstruction fit in said complementing holes.

12. The invention as defined in claim 10 in which said holes are provided in said clips and said projections have formed heads pressing against said clips and uring said clips into engagement with the other of said members.

13. The invention as defined in claim 10, in which pairs of said projections are overlapped and secured together to hold said clips in place.

14. The invention as defined in claim 9 in which said stator is made of plastic material, said clip mounting stations are defined by opposed, spatially separated walls extending outwardly from said stator walls, and said clips are positioned in said stations for engagement with and to be restrained against angular movement by said walls.

15. The invention as defined in claim 14 in which said fastening means consists of projections in said clip mounting stations and complementing holes in said clips, said projections have formed heads pressing on said clips and urging said clips into engagement with said stator, and part of said material adjacent said walls is formed over and against said clips.

16. The invention as defined in claim 14 in which said fastening means consists of spaced tabs bent from the body of said clips and spaced slots in said stator within said mounting stations, the ends of said tabs extending beyond said slots being bent over one upon the other and secured together.

17. In a switch section for a multiple contact switch for simultaneously switching a plurality of circuits, a rotor, a contact carried by said rotor having an inner clip engaging portion and an outer clip engaging portion, a stator provided with an opening in which said rotor is carried, said stator having a plurality of clip mounting stations arranged about said opening, at least one of said stations having an inner and an outer clip mounting position, a plurality of identically sized clips mounted on said stator at least one of which is positioned in said inner mounting position to engage the inner clip engaging portion of said contact, and fastening means for locking said clips to said stator, said rotor cosisting of two identical halves each of which has a hole and a pin which frictionally interfit when the halves are placed back to back, each half having a peripheral flange adapted to slide against said stator, said halves having projecting nibs and said contact having holes into which said nibs fit, said nibs having formed heads pressing against said contacts.

18. In a switch section for a multiple contact switch for simultaneously switching a plurality of circuits, a rotor, a contact carried by said rotor having an inner clip engaging portion and an outer clip engaging portion, a stator provided with an opening in which said rotor is carried, said stator having a plurality of clip mounting stations arranged about said opening, at least one of said stations having an inner and an outer clip mounting position, a plurality of identically sized clips mounted on said stator at least one of which is positioned in said inner mounting position to engage the inner clip engaging portion of said contact, and fastening means for locking said clips to said stator, said rotor having flange portions extending radially thereof and a plurality of flexible fingers extending in the direction of the axis of rotation thereof, said fingers having barbs, said flange portions and said barbs engaging opposite sides of said stator adjacent said opening to hold said rotor in operative position, said fingers being displaceable radially inwardly to permit said barbs to be inserted through said opening.

References Cited by the Examiner

UNITED STATES PATENTS

| | | | |
|---|---|---|---|
| 484,642 | 10/1892 | Patterson | 200—166 |
| 1,702,035 | 2/1929 | Berthold | 200—166 X |
| 1,939,369 | 12/1933 | Shelley | 200—166 X |
| 2,594,190 | 4/1952 | Mastney | 200—11 |
| 2,641,050 | 6/1953 | Graybill et al. | 29—155.5 |
| 2,666,253 | 1/1954 | Morbury | 29—155.5 |
| 2,803,000 | 8/1957 | Johanson | 339—128 |
| 2,809,361 | 10/1957 | Woofter et al. | 339—128 X |
| 2,828,393 | 3/1958 | Wingard | 200—11 |
| 2,870,276 | 1/1959 | Gelzer | 200—11 |
| 2,874,338 | 2/1959 | Pease | 200—67 |
| 2,949,511 | 8/1960 | Glueckstein et al. | 200—11 |

FOREIGN PATENTS

| | | |
|---|---|---|
| 907,460 | 6/1945 | France. |
| 961,552 | 4/1957 | Germany. |
| 765,182 | 1/1957 | Great Britain. |

KATHLEEN H. CLAFFY, *Primary Examiner.*

MAX L. LEVY, BERNARD A. GILHEANY, *Examiners.*